United States Patent [19]
Kai et al.

[11] Patent Number: 5,285,295
[45] Date of Patent: Feb. 8, 1994

[54] LINE IMAGE SENSOR

[75] Inventors: Tsutomu Kai; Takeshi Shimamoto, both of Hirakata, Japan

[73] Assignee: Matsushita Electric Industrial Co., Ltd., Kadoma, Japan

[21] Appl. No.: 709,224

[22] Filed: Jun. 3, 1991

[30] Foreign Application Priority Data

Jun. 5, 1990 [JP] Japan .................................. 2-148243

[51] Int. Cl.$^5$ ............................................... H04N 1/04
[52] U.S. Cl. ...................................... 358/482; 358/483; 250/208.1; 348/249; 348/283
[58] Field of Search ............... 358/401, 474, 482, 483, 358/213.11, 213.15, 213.19, 213.22, 213.26, 213.27, 213.23; 250/208.1

[56] References Cited

U.S. PATENT DOCUMENTS

| | | | |
|---|---|---|---|
| 4,654,713 | 3/1987 | Boucharlat et al. | 358/483 |
| 4,665,440 | 5/1987 | Tromborg | 358/483 |
| 4,928,158 | 5/1990 | Kimata | 358/213.26 |

Primary Examiner—Edward L. Coles, Sr.
Assistant Examiner—Jerome Grant, II
Attorney, Agent, or Firm—Wenderoth, Lind & Ponack

[57] ABSTRACT

A shift register of a CCD line image sensor is divided into two from the center thereof so as to transfer the signal electrical charge for output portions placed on both ends of the sensor, so that the line image sensor has a higher data rate, and reduced optical smearing. Furthermore, when a color line image sensor has been made using such line image sensors, the clearance of the sensor may be made smaller, and the amount of the correction smear for positioning alignment may be reduced.

5 Claims, 6 Drawing Sheets

LINE IMAGE SENSOR

BACKGROUND OF THE INVENTION

The present invention generally relates to a line image sensor which is used in an image signal portion for a copying machine, a FAX, an image scanner or the like.

In recent years, the demand for a higher copy speed and lower price in copying machines has increased. The demand for a higher copy speed and lower price in the line image sensors used in copying machines has also increased.

The long-standing line image sensor is composed of: a light receiving portion for converting the incident light into electrical signals with light receiving elements being arranged in a main-scanning direction: a transfer portion for receiving electrical charge caused in the above described light receiving elements so as to transfer it; an output portion having two output portions for receiving the electrical charge from the transfer portion and for converting it into an output voltage signal. (Tompsett ets. "Charge Coupled Imaging Devices: Experimental Result, "IEEE Trans. on Electron Devices ED-18, 992-996 (1971))

Signals generated in the light receiving portion consisting of N light receiving elements are r transferred as 94 electrical charge into the transfer portion. In the transfer portion, the signal electrical charge is sequentially transferred towards the output portion. In the output portion, N serial data are outputted.

The output portion cannot convert the volume of electrical charges to a voltage signal when the driving frequency is high. Therefore, the line image sensor cannot be driven at high speeds.

In order to compensate for the defect, there is also a line image sensor, which is bilinear in construction, and which is composed of two output portions, pairing off each transfer portion with the transfer portion being disposed on both the side faces of the light receiving portion. (Tompsett etc. "Charge Coupling Improves Its Image, Challenging Video Camera Tubes, "Electronics 46, No. 2, 162-168 (1973)).

In this case, signals generated in a light receiving portion composed of N of light receiving elements are alternately transferred into the transfer portion at both side faces. In each transfer portion, the N/2 data is transferred. Similarly, two output portions each handle half the data being processed, so that a data rate which is twice the driving frequency may be obtained.

In the above described construction, the width of the line image sensor becomes larger. Especially, in the case of a color image sensor made with three lines thereof being arranged in parallel in the sub-scanning direction, the clearance of the light receiving portion is larger, and the correction memory required for the positional alignment of each image sensor is necessarily large in size. Assume that the clearance of the light receiving portion has 12 line pitches, and the information of a point before 12 lines is read by a first sensor before the next light receiving portion reads the information of that time after the information at a certain point has been read by a first light receiving portion. The memory amount which is necessary in the reading A3 manuscript at 400DPI, eight gradations becomes:

$$5000 \text{ image elements} \times (13+26) = 195 \text{ k byte}$$

SUMMARY OF THE INVENTION

Accordingly, the present invention has been developed with a view to substantially eliminate the above discussed drawbacks inherent in the prior art, and has for its essential object to provide a line image sensor which has a higher data rate, and is narrow in width.

Another important object of the present invention is to provide a line image sensor which has a higher data rate, and narrower in width, and further, a color line image sensor which makes it possible to minimize an externally required correction memory.

In accomplishing these and other objects, according to one preferred embodiment of the present invention, there is provided a line image sensor, which is adapted to halve the transfer portion into a right half and a left half, and to have an output portion corresponding to each transfer portion on both sides of the light receiving portion.

In the color line image sensor, a memory means for correcting the reading position in addition to the above described construction is added.

According to the present invention as described hereinabove, (1) The high speed line image sensor may be obtained by two-division of a shift register. Further, as the transfer distance may be halved, the optical smears may be reduced, and the transfer efficiency may be improved.

(2) In the color line image sensor, the transfer portion corresponding to each light receiving portion is disposed only on a single side of the above described light receiving portion, and the output portion is disposed on both ends of the sensor, so that the clearance of the light receiving portion may be made smaller and the memory to be used in the correction of the positional offset may be reduced.

(3) By the provision of the correction memory corresponding to the light receiving portion clearance being provided in the transfer portion, the external correcting memory for correcting the offset of the reading position is made unnecessary and the circuit which is externally required may be eliminated.

BRIEF DESCRIPTION OF THE DRAWINGS

These and other objects and features of the present invention will become apparent from the following description taken in conjunction with the preferred embodiment thereof with reference to the accompanying drawings, in which;

FIG. 8 (A) shows the arrangement of data projected onto the sensor; and

FIG. 8 (B) is a data arrangement view within a memory.

DETAILED DESCRIPTION OF THE INVENTION

Before the description of the present invention proceeds, it is to be noted that like parts are designated by like reference numerals throughout the accompanying drawings.

Figure 1:
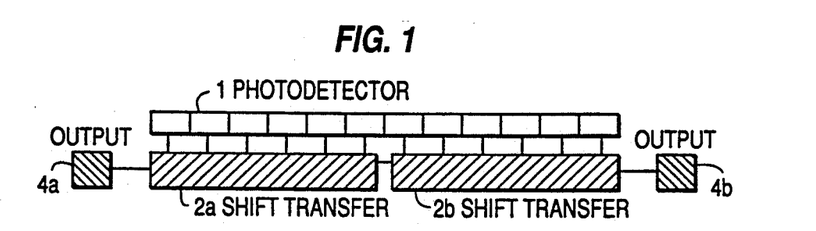
FIG. 1 is a block diagram of a line image sensor in accordance with a first embodiment of the present invention.

Referring now to the drawings, FIG. 1 illustrates a light receiving portion 1 with light receiving elements being arranged in a main scanning reaction, two transfer portions 2a and 2b with registers facing the light receiving elements of the above described light receiving portion and being arranged on one side face of the light receiving portion: two output portions 4a and 4b disposed on both the sides of the light receiving portion corresponding to the above described transfer portion.

The incident light into the line image sensor is converted into electrical charge signals by the light receiving elements within the light receiving portion 1. The electrical charge caused by the light receiving elements is transferred into the corresponding registers within the transfer portions 2a, 2b by the addition of an externally applied transfer clock. The signal charge stored in the register is arranged so that the register of the left transfer portion 2a sequentially transfers the signal electrical charge into the left adjacent register, and the register within the right transfer portion 2b sequentially transfers the signal electric charge into the right adjacent register by the addition of externally applied shift clocks. The signal electric charge are fed into the output portions 4a and 4b from the register closest to the output portion of each transfer portion, and are outputted as two phase image data.

According to the present embodiment as described hereinabove, a data rate which is twice the driving frequency may be obtained by the division into two parts of the transfer portion as in the line image sensor of the conventional bilinear construction with the two transfer portions being disposed on the side faces of the light receiving portion, and the width in the sub-scanning direction of the sensor may be made smaller. Since the transfer path length is divided in half without changes in the number of transfer stages, or reset time, the optical smears which are caused by the light incident upon the transfer portion may be reduced, and the transfer efficiency may be increased.

Figure 2:
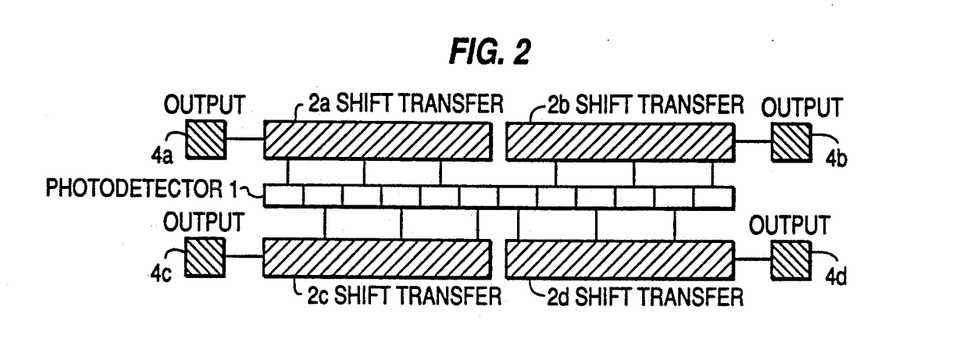
FIG. 2 is a block diagram of a line image sensor in accordance with a second embodiment of the present invention.

In FIG. 2, element 1 is a light receiving portion with the light receiving elements being disposed in the main scanning direction: elements 2a, 2b, 2c, and 2d are four transfer portions with the registers in a 1 to 1 correspondence with the light receiving elements of the above described light receiving portion and disposed on both the side faces of the light receiving portion 1; elements 4a, 4b, 4c and 4d are four output portions disposed at the ends of the line image sensor corresponding to the above described transfer portions.

The electrical charge caused by the light receiving elements of the light receiving portion is transferred to the corresponding registers within the transfer portions 2a, 2b, 2c and 2d by the addition of externally applied transfer clocks. The signal charge stored in the register are arranged so that the registers of the left transfer portions 2a and 2c sequentially transfer the signal electrical charge into the left adjacent register, and the registers within the right transfer portions 2b and 2d sequentially transfer the signal electric charge into the right adjacent register by the addition of externally applied shift clocks. The signal electrical charge is fed into the respective corresponding output portions 4a, 4b, 4c, and 4d from the register closest to the output portion of each transfer portion so as to output four phase image data.

According to the present embodiment, a data rate which is four times the driving frequency may be obtained by the division of the transfer portion as in the line image sensor of the conventional bilinear construction with two transfer portions being disposed on the side faces of the light receiving portion, and further, the optical smears may be reduced as in the first embodiment.

Figure 3:
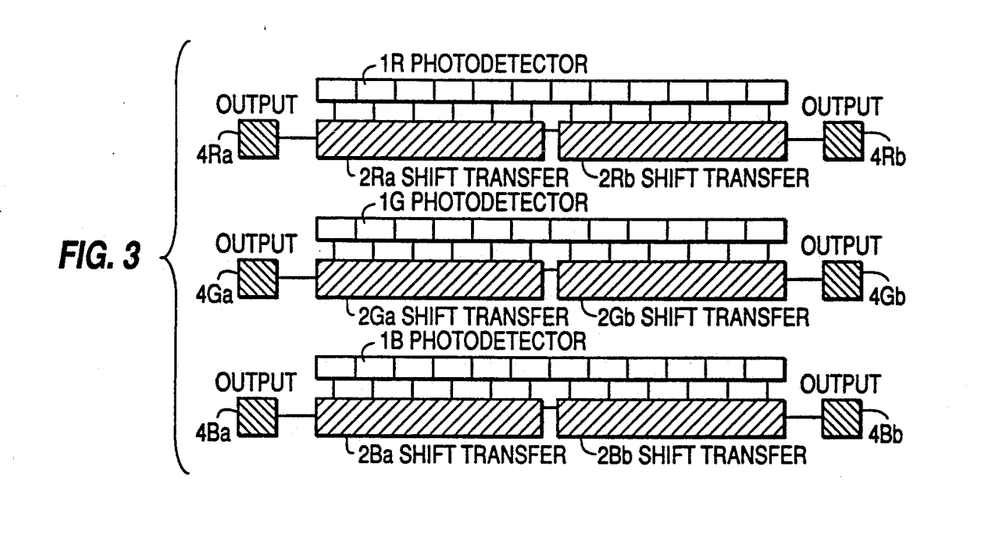
FIG. 3 is a block diagram of a color line image sensor in accordance with a third embodiment of the present invention.

In the line image sensor of FIG. 3, the line image sensor in a first embodiment is disposed in three lines in parallel in the auxiliary scanning direction so as to effect the color manuscript reading operation. Each of them is distinguished with accompanied letters of R, G, B. As the respective constructions and actions are the same as in the above described first embodiment, a detailed description thereof has been omitted.

According to the present embodiment, the transfer portion is respectively divided and is disposed on one side face of the light receiving portion. Further, by the provision of the output portion on the ends thereof, the pitch between the light receiving portions may be made half that of the color line image sensor of the conventional bilinear construction. The amount of correcting memory for the positional correction required externally may be reduced by nearly half.

Figure 4:
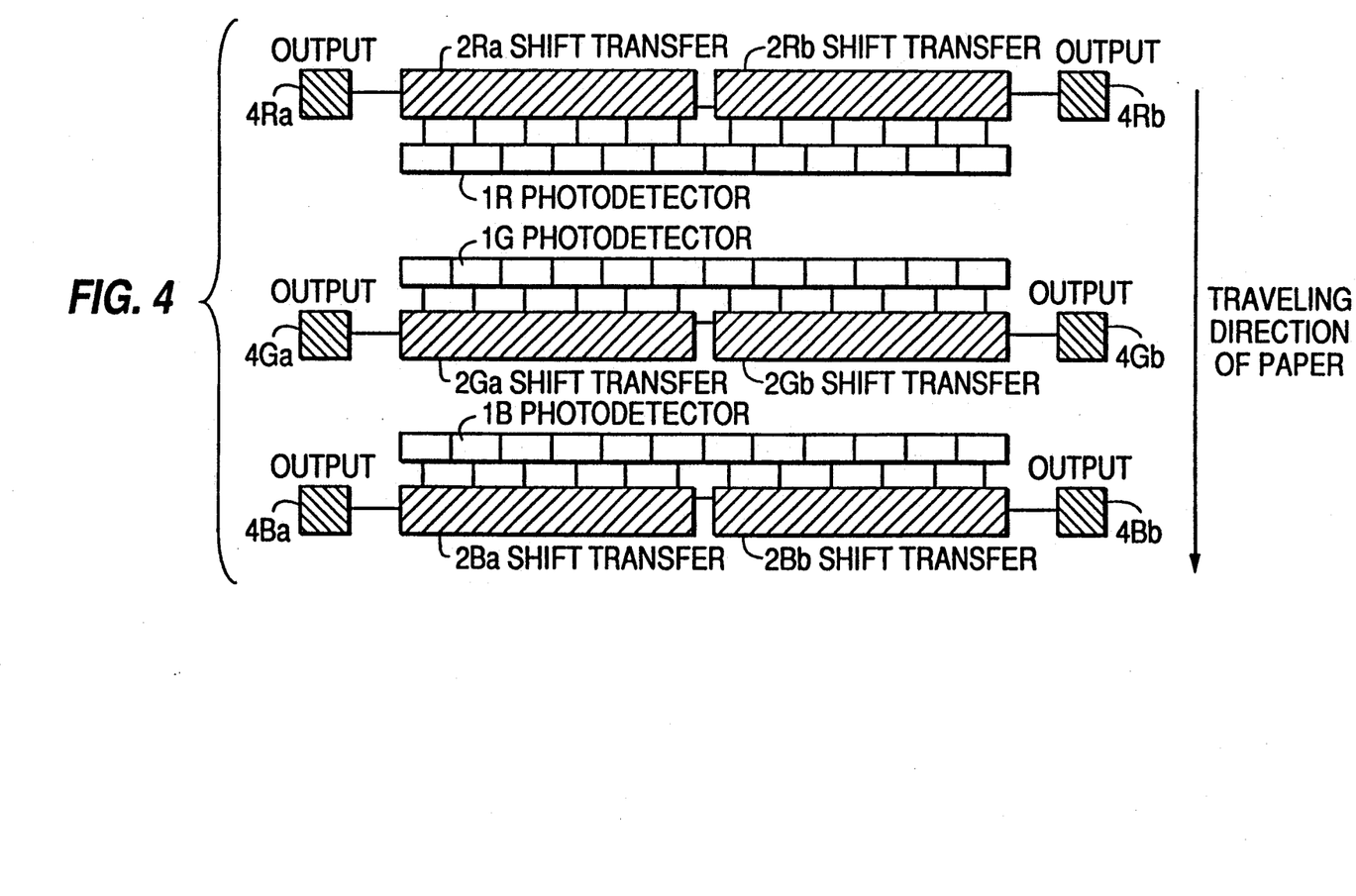
FIG. 4 is a block diagram of a color line image sensor in accordance with a fourth embodiment of the present invention.

In FIG. 4, the line image sensor in the above described first embodiment is disposed in three lines in parallel in the auxiliary scanning direction, and the sensor on the exterior side is arranged so that the light receiving portion may be directed at the inner side thereof. They are respectively distinguished with the accompanied letters of R, G, B. A description of their respective constructions and actions has been omitted.

The color line image sensor constructed as described hereinabove will be described hereinafter in its operation in a case where it is used in the image reading apparatus. When the manuscript is read with the color line image sensor of the above described construction being moved in the arrow direction in the drawing, the information that some picture elements of the light receiving portion 1R read is previously read only for time corresponding to the clearance of the light receiving portions 1R and 1G for the corresponding picture element 1G, and is previously read only for time that image sensor takes to move the clearance of the light receiving portions 1R and 1B for a picture element with the light receiving portion 1B existing. Although the data obtained by the light receiving portions 1B and 1G at this time have to be retained until the 1R moves into the respective present position of the 1B and 1G, the memory where the data is retained may be kept made than before, because the pitch between the lines is made narrow in the color line image sensor of the present embodiment. When the capacity of the correction memory required externally is computed in the same conditions as in the conventional embodiment, 5000 picture elements×(1+8) lines=45 k bytes so that the correction memory may be considerably reduced.

According to the present embodiment, a color line image sensor which is narrowed between the light receiving portions may be obtained, so that the amount of correction memory required externally may be considerably reduced.

Figure 5:
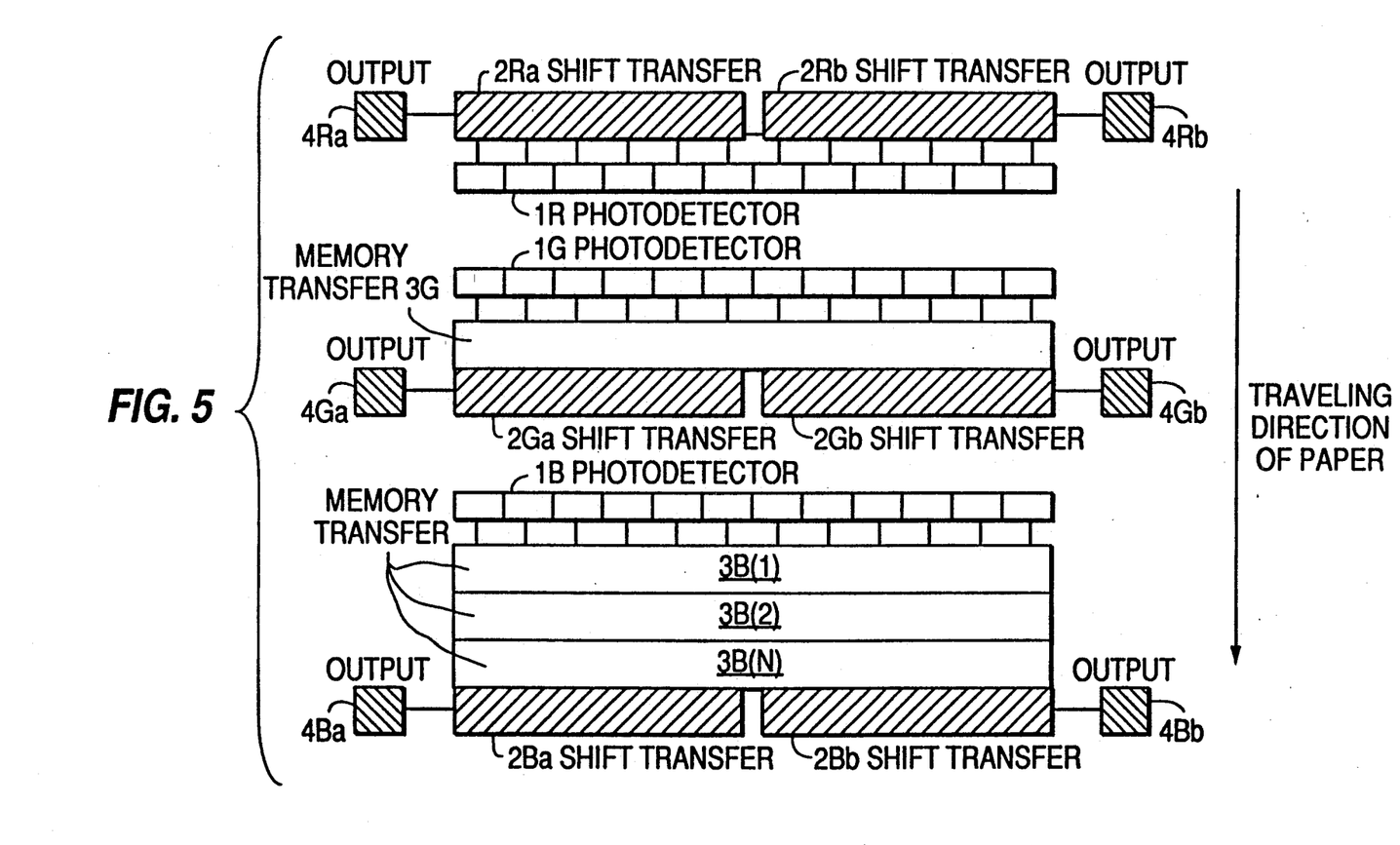
FIG. 5 is a block diagram of a color line image sensor in accordance with a fifth embodiment of the present invention.

FIG. 5 is different in that in addition to the construction of the color line image as in the fourth embodiment, the correction registers 3G, 3B (1), 3B (2), ..., 3B (N) for correcting the offset of the reading position in the auxiliary scanning direction corresponding to the clearance between each light receiving portion and the light receiving portion of the reference sensor are provided on the line image sensors (B, G) except for the line image sensor (R in the drawing) which becomes the reference.

Figure 7:
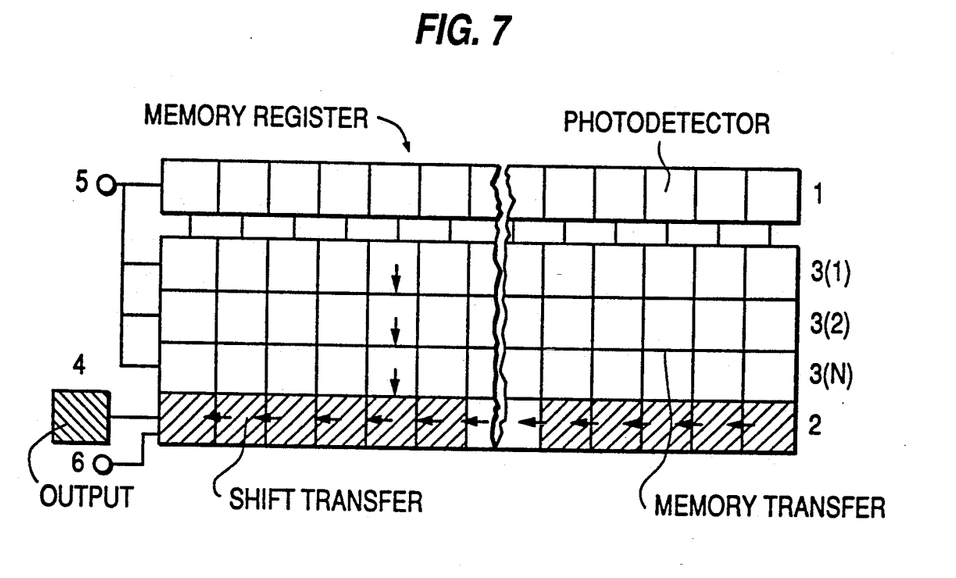
FIG. 7 is an illustrating view of a correction register.

FIG. 7 is a drawing for illustrating the operation of the correction register. The signal electrical charge which has been photoelectrically converted by the light receiving element 1 within the accumulating time is transferred into a first string of memory register 3 (1) by the application of externally generated transfer clocks. The signal electrical charge which was in the first string memory register at this time is also transferred into a second string of memory registers 3 (2). The signal electrical charge retained in the memory registers of the front stage in the same manner is transferred one after another into the memory registers of the rear stage. The signal electrical charge retained in the final stage 3 (N) is also transferred into the register 2 disposed at the rear stage in this manner. The electrical charge transferred into the register 2 is transferred into the adjacent register by the other clock. By the use of the correction register string of a N stage, the delay of the N string portion may be realized by the device inner portion.

In accordance with the present embodiment, the positional offset in reading caused by the movement in the auxiliary scanning direction of the color line image sensor may be corrected within the color line image sensor by the provision of the correction register, so that no external correction memory is required.

Through the replacement of the memory register disposed between the sensors equivalent to the 3G in the drawing by the external correction memory, the step area may be reduced.

Figure 6:
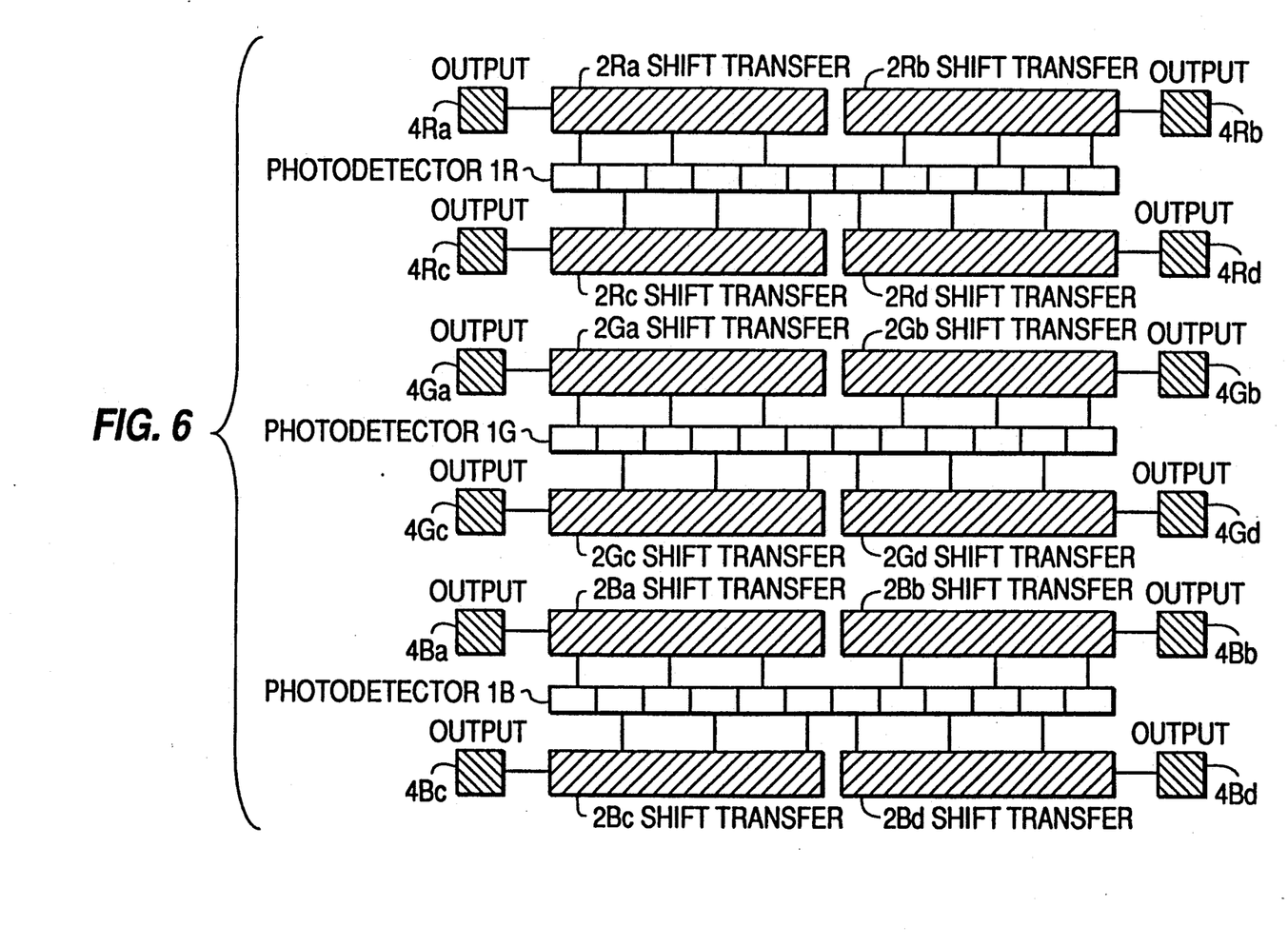
FIG. 6 is a block diagram of a color line image line sensor in accordance with a sixth embodiment of the present invention.

In the line image sensor of FIG. 6, the line image sensors in the second embodiment are disposed in three lines in parallel in the auxiliary scanning direction for effecting the color manuscript reading operation. They are respectively distinguished with accompanying letters of R, G, B. As the respective construction and action are the same as in the above described second embodiment, a detailed description thereof has been omitted.

According to the present embodiment, the transfer portion is respectively divided, and is provided on the side faces. Furthermore, by the placement of the output portion at the ends thereof, the pitch between the light receiving portions may be made the same as the color line image sensor of the conventional bilinear construction, while a data rate which is four times the clock rate is obtained. Also, even in this case, the amount of the optical smear may be reduced.

Figure 8A:
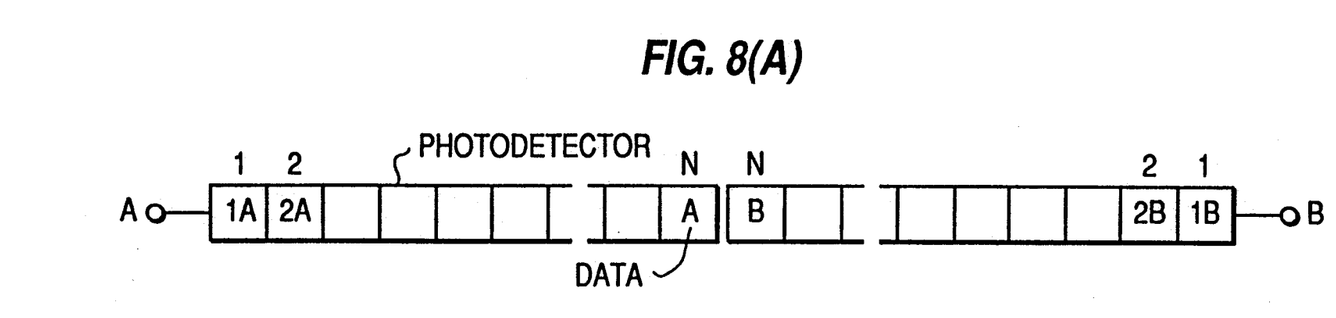

By the use of the above described line image sensor, the arrangement of the data projected onto the sensor is provided as in FIG. 8 (A). The arrangement of the data to be read becomes different from the serial data at one end from one end of the line image sensor conventionally used. So as to solve it, the way of causing the addresses of writing and reading with respect to the memory has only to be changed. Hereinafter the address with respect to the memory is shown with N number, which will be described (N is equal to one the half number of picture elements).

Figure 8B:
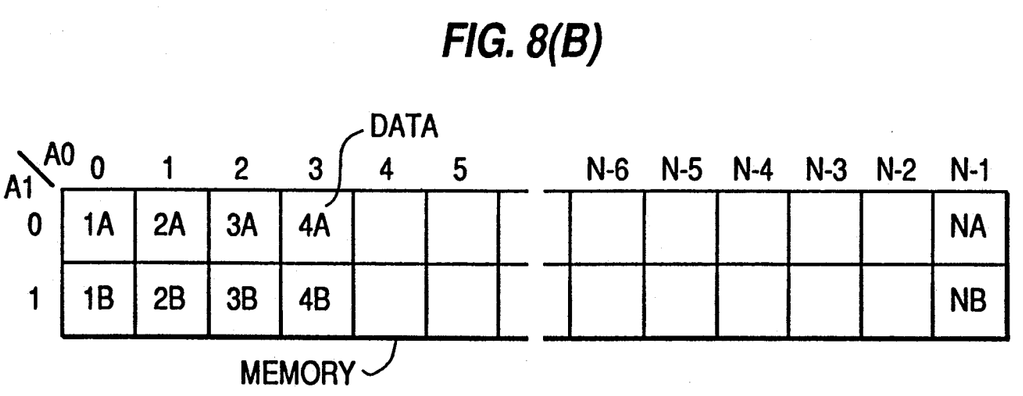

At the writing time, the data to be outputted from the output portion 4a are written in the order of the address (0,0) through (0, N-1). The data to be outputted from 4b are written in the order of the address (1, 0) through (1, N-1). The data are written on the memory as shown in FIG. 8 (B). In the reading operation, the data are read in the order of the address (0, 0) through (0, N-1). Then, the data are read in the order of the address (1, 0) through (1, N-1). The address A (A1, A0) in the reading operation is determined in order in accordance with the following formula.

$$A0 = A0 + S$$
$$A1 = A1 + (S = 0)$$
$$S = S - (A0 = N)$$

The respective initial values are $A0=A1=0$, $S=1$. By drawing out the data by such a method, the arrangement of the same data as before may be obtained. As the several line buffers are prepared for the various types of image processing in the digital copying machine to be used at present, there is possibility that the memory means is not necessarily increased for the rearrangement of the data, and one line portion will do at most if it is increased.

Although the present invention has been fully described by way of example with reference to the accompanying drawings, it is to be noted here that various changes and modifications will be apparent to those skilled in the art. Therefore, unless such changes and modifications otherwise depart from the scope of the present invention, they should be construed as being included therein.

What is claimed is:

1. A line image sensor comprising:
    a light receiving portion arranged in a line in a major scanning direction;
    a plurality of light receiving elements for converting a projected light into an electrical signal;
    two transfer portions each divided in two and located in one line in said major scanning direction for transferring said electrical signal of said receiving elements; and
    two output portions for outputting an electrical signal of said two transfer portions, said two output portions being connected to an end plane which is facing away from said two transfer portions, whereby said two transfer portions transfer a detected signal toward said two output portions.

2. A line image sensor as defined in claim 1, wherein a plurality of line image sensors are arranged in parallel so as to constituted a color line image sensor.

3. A line image sensor as defined in claim 2, wherein two light receiving portions selected from among said light receiving portions of said plurality of line image sensors are aligned adjacent to each other.

4. A line image sensor comprising:
    a light receiving portion arranged in a line in a major scanning direction;

a plurality of light receiving elements for converting a projected light into an electrical signal;

four transfer portions each divided in two and located on both sides of said light receiving portion in said major scanning direction for transferring said electrical signal of said receiving elements;

four output portions for outputting an electrical signal of said four transfer portions, said four output portions being connected to an end plane which is facing away from said four transfer portions, whereby said four transfer portions transfer a detected signal toward said four output portions.

5. A line image sensor as defined in claim 4, wherein a plurality of line image sensors are arranged in parallel so as to constitute a color line image sensor.

* * * * *